(12) United States Patent
Suciu et al.

(10) Patent No.: US 9,970,322 B2
(45) Date of Patent: May 15, 2018

(54) ENGINE MOUNTING SYSTEM

(71) Applicant: United Technologies Corporation, Hartford, CT (US)

(72) Inventors: Gabriel L. Suciu, Glastonbury, CT (US); Brian D. Merry, Andover, CT (US)

(73) Assignee: United Technologies Corporation, Farmington, CT (US)

(*) Notice: Subject to any disclaimer, the term of this patent is extended or adjusted under 35 U.S.C. 154(b) by 341 days.

(21) Appl. No.: 14/759,986

(22) PCT Filed: Mar. 11, 2014

(86) PCT No.: PCT/US2014/022936
§ 371 (c)(1),
(2) Date: Jul. 9, 2015

(87) PCT Pub. No.: WO2014/164586
PCT Pub. Date: Oct. 9, 2014

(65) Prior Publication Data
US 2015/0361828 A1    Dec. 17, 2015

Related U.S. Application Data

(60) Provisional application No. 61/778,773, filed on Mar. 13, 2013.

(51) Int. Cl.
*F01D 25/16* (2006.01)
*B64D 27/18* (2006.01)
(Continued)

(52) U.S. Cl.
CPC .......... *F01D 25/162* (2013.01); *B64D 27/18* (2013.01); *F01D 25/28* (2013.01); *F02C 7/20* (2013.01);
(Continued)

(58) Field of Classification Search
CPC ....... F01D 25/162; F01D 25/28; B64D 27/18; B64D 2027/264; F02C 7/20; Y02T 50/44; Y02T 50/671
(Continued)

(56) References Cited

U.S. PATENT DOCUMENTS 2,445,661 A * 7/1948 Hayne ................ F01D 9/042
                                                      415/115
3,282,560 A * 11/1966 Kleckner .............. F01D 1/32
                                                      415/216.1
(Continued)

FOREIGN PATENT DOCUMENTS

EP     2025898 A2    2/2009
JP     2009138745 A  6/2009

OTHER PUBLICATIONS

Extended European Search Report dated Oct. 20, 2016, 8 pages.
The International Search Report dated Jul. 11, 2014 for International Application No. PCT/US2014/022936.

*Primary Examiner* — Aaron R Eastman
(74) *Attorney, Agent, or Firm* — Kinney & Lange, P.A.

(57) ABSTRACT

A mounting system for a gas turbine engine includes a low pressure turbine section, a first bearing, a mid-turbine frame, and a rear mount. The first bearing supports at least a portion of the low pressure turbine section. The mid-turbine frame supports the first bearing. The rear mount is connected to the mid-turbine frame and is configured to react loads from the gas turbine engine.

10 Claims, 6 Drawing Sheets

(51) Int. Cl.
*F01D 25/28* (2006.01)
*F02C 7/20* (2006.01)
*B64D 27/26* (2006.01)

(52) U.S. Cl.
CPC ......... *B64D 2027/264* (2013.01); *Y02T 50/44* (2013.01); *Y02T 50/671* (2013.01)

(58) Field of Classification Search
USPC ....................................................... 415/213.1
See application file for complete search history.

(56) References Cited

U.S. PATENT DOCUMENTS

| | | | | |
|---|---|---|---|---|
| 4,245,951 A * | 1/1981 | Minnich | ................ | F01D 9/065 415/139 |
| 4,548,546 A * | 10/1985 | Lardellier | ............ | F01D 21/003 33/543 |
| 7,269,938 B2 * | 9/2007 | Moniz | .................... | F01D 25/16 415/68 |
| 8,256,707 B2 | 9/2012 | Suciu et al. | | |
| 8,267,349 B2 | 9/2012 | Suciu et al. | | |
| 2001/0031200 A1 * | 10/2001 | Kuhn | ...................... | F01D 25/30 415/108 |
| 2003/0097844 A1 * | 5/2003 | Seda | ..................... | F01D 25/162 60/791 |
| 2008/0031727 A1 * | 2/2008 | Sjoqvist | ................ | F01D 25/162 415/142 |
| 2008/0056888 A1 * | 3/2008 | Somanath | ................ | F01D 5/147 415/142 |
| 2009/0056343 A1 * | 3/2009 | Suciu | ........................ | F02C 7/20 60/797 |
| 2009/0314881 A1 | 12/2009 | Suciu et al. | | |
| 2010/0056213 A1 | 3/2010 | Somanath et al. | | |
| 2010/0132369 A1 * | 6/2010 | Durocher | ................ | F01D 9/065 60/796 |
| 2011/0079019 A1 * | 4/2011 | Durocher | ................ | F01D 5/082 60/796 |
| 2012/0121390 A1 | 5/2012 | Suciu et al. | | |

* cited by examiner

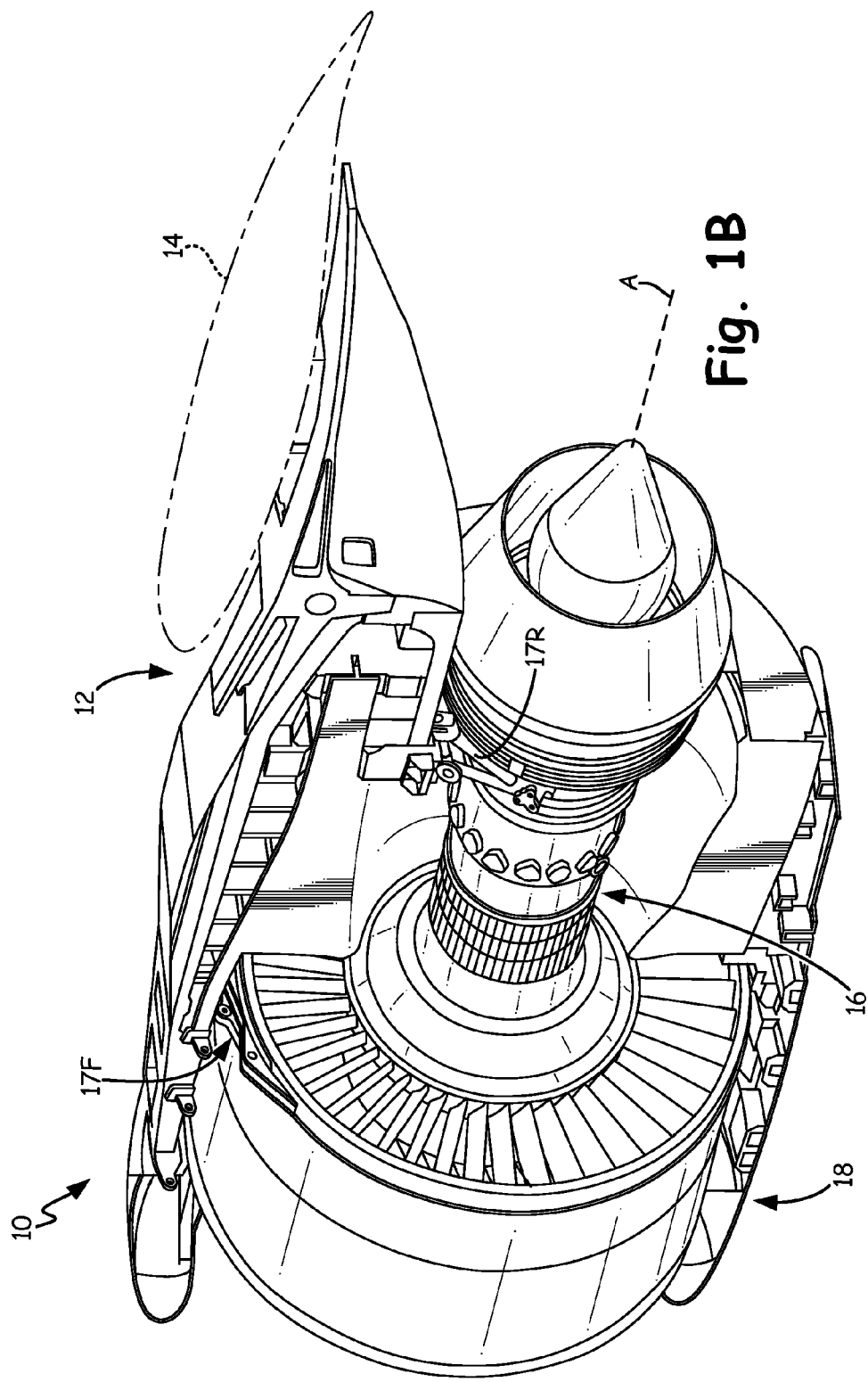

ENGINE MOUNTING SYSTEM

CROSS-REFERENCE TO RELATED APPLICATION(S)

This application claims the benefit of U.S. Provisional Application No. 61/778,773 filed Mar. 13, 2013 for "Engine Mounting System" by Gabriel L. Suciu and Brian D. Merry and International Application No. PCT/US2014/022936 filed Mar. 11, 2014 for "Engine Mounting System" by Gabriel L. Suciu and Brian D. Merry.

BACKGROUND

The present invention relates to gas turbine engines, and more particularly to an engine mounting configuration for gas turbine engines.

Gas turbine engine may be mounted at various points on an aircraft. One mounting configuration uses a pylon integrated with an aircraft structure. This engine mounting configuration ensures the transmission of loads between the engine and the aircraft structure. The loads typically include the weight of the engine, its thrust, aerodynamic loads, maneuver loads, and rotary torque about the engine axis. The engine mounting configuration must also absorb the deformations the engine is subjected to during different flight phases and dimensional variations due to thermal expansion and retraction.

One conventional engine mounting configuration mounts to the pylon with a forward mount and a rear mount. The rear mount handles vertical and side loads and engine torque, and is mounted directly to the turbine exhaust case. Although effective, one disadvantage of this mounting arrangement is that the engine is disposed further away from the wing. Disposing the engine further away from the wing can negatively impact ground clearance and/or wing to engine nacelle gully height.

SUMMARY

A mounting system for a gas turbine engine includes a low pressure turbine section, a first bearing, a mid-turbine frame, and a rear mount. The first bearing supports at least a portion of the low pressure turbine section. The mid-turbine frame supports the first bearing. The rear mount is connected to the mid-turbine frame and is configured to react loads from the gas turbine engine.

A gas turbine engine includes a low pressure turbine section, a first bearing, a high pressure turbine section, a second bearing, a mid-turbine frame, and a rear mount. The first bearing supports at least a portion of the low pressure turbine section. The second bearing supports at least a portion of the high pressure turbine section. The mid-turbine frame supports both the first bearing and the second bearing. The rear mount connects to an exterior casing of the mid-turbine frame and is configured to react loads from the gas turbine engine.

A mounting system for a gas turbine engine includes a low pressure turbine section with a turbine exhaust case, a first bearing, a high pressure turbine section, a second bearing, a mid-turbine frame, and a rear mount. The first bearing supports a portion of the low pressure turbine. The second bearing supports a portion of the high pressure turbine section. The mid-turbine frame supports both the first bearing and the second bearing. The rear mount connects to an exterior casing of the mid-turbine frame and is configured to react loads from the gas turbine engine.

BRIEF DESCRIPTION OF THE DRAWINGS

FIG. 1B is a perspective view of the engine mount system of FIG. 1A from the rear.

DETAILED DESCRIPTION

Figure 1A:
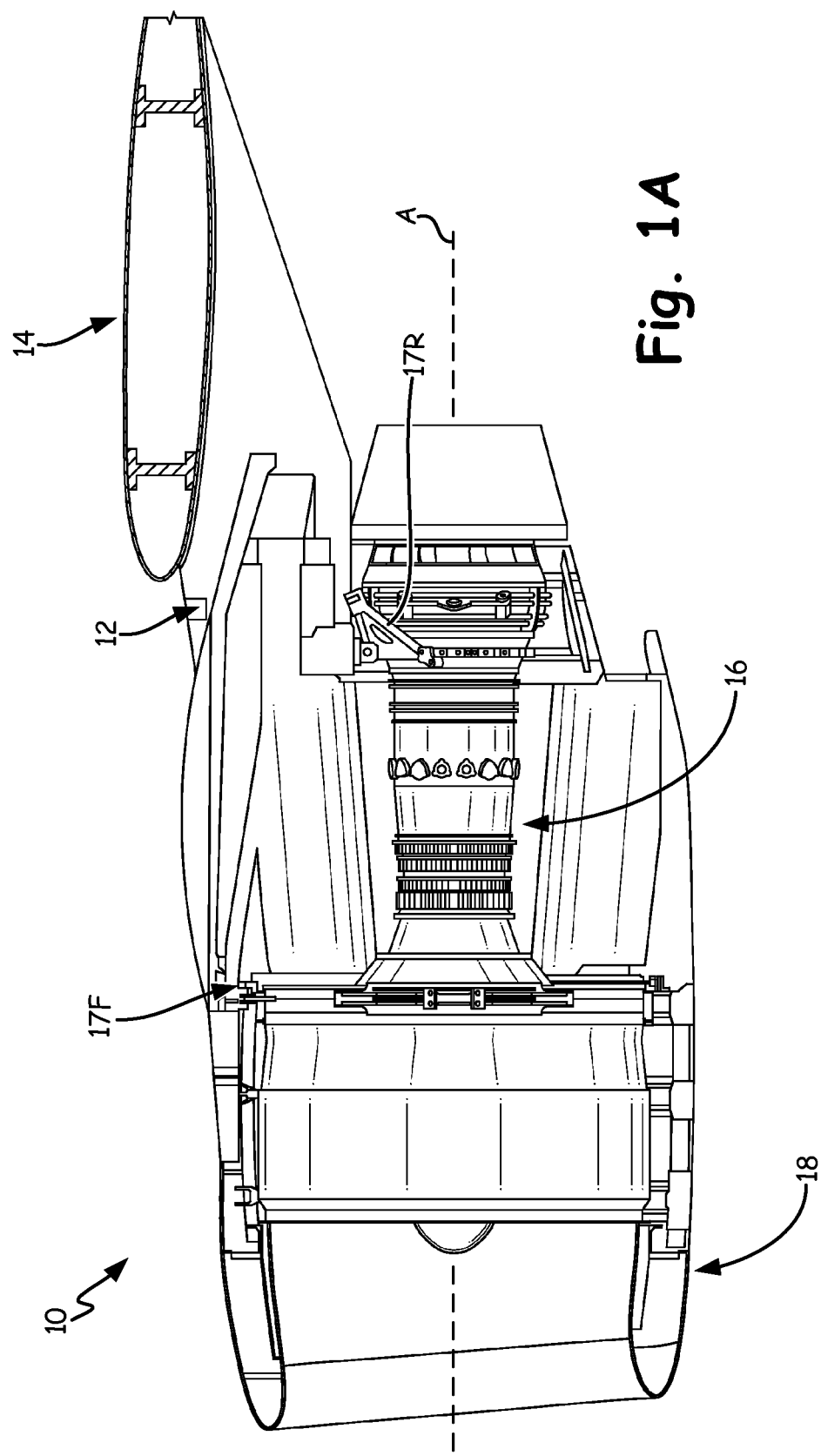
FIG. 1A is a side view of an engine mount system within a nacelle.

As provided in the appended figures, the application discloses affixing a rear mount 17R, 170R to a mid-turbine frame 20 such that the mid-turbine frame 20 supports a load of a high pressure turbine section 30 as well as a portion of a load of a low pressure turbine section 26. In one embodiment, this is accomplished utilizing two sets of bearings 112, 114 mounted to the mid-turbine frame 20. The low pressure turbine section 26 has a straddled configuration and is supported from the mid-turbine frame 20 by one of the two sets of bearings 112 as well as by the turbine exhaust case 56. The benefits of affixing the rear mount 17R, 170R to the mid-turbine frame 20 and utilizing two sets of bearings 112, 114 include: (1) a more aerodynamic configuration can be achieved because the pylon 12, 120 is hidden within the lines of the nacelle, (2) the engine can be moved closer to the pylon 12, 120 and wing 14 to improve gully height, (3) a larger pylon 12, 120 can be used if desired, and (4) a lighter less structural low turbine case 54 and turbine exhaust case 56 can be utilized reducing engine weight and reducing the size of the turbine exhaust case 56.

FIGS. 1A and 1B illustrate general partial schematic views of gas turbofan engine 10 suspended from engine pylon 12, for mounting to wing 14. Engine 10 includes core 16 and nacelle 18. Forward mount 17F and rear mount 17R connect engine 10 to engine pylon 12.

Core 16 is disposed within nacelle 18, and is connected to portion of pylon 12 that is disposed under nacelle 18 via front mount 17F and rear mount 17R. Rear mount 17R reacts engine thrust at the aft (rear) end of engine 10. As used herein, the term "reacts" is defined as absorbing a load and dissipating the load to another location of engine 10. In the embodiment shown, rear mount 17R is secured to core 16 at mid-turbine frame 20 (FIG. 1C) via thrust case 52C (FIG. 1C).

Forward mount 17F reacts vertical loads and side loads. In the embodiment shown in FIGS. 1A and 1B, forward mount 17F includes a shackle arrangement that mounts to fan frame 48 (FIG. 1C) at two points, as is further described in U.S. Pat. Nos. 8,267,349, and 8,256,707, which are incorporated herein by reference. In the embodiment illustrated in FIGS. 1A-1C, forward mount 17F is secured to fan frame 48. In other embodiments, forward mount 17F can be secured to intermediate case 49 of core 16 (see FIGS. 2A and 2B).

The arrangement of forward mount 17F and rear mount 17R to fan frame 48 and mid-turbine frame 20 (FIG. 1C), respectively, creates a more aerodynamic configuration as pylon 12 is hidden within the lines of nacelle 18. Additionally, engine 10 is moved closer to pylon 12 and wing 14 to improve gully height. The arrangement also allows a larger pylon 12 to be used if desired.

Figure 1C:
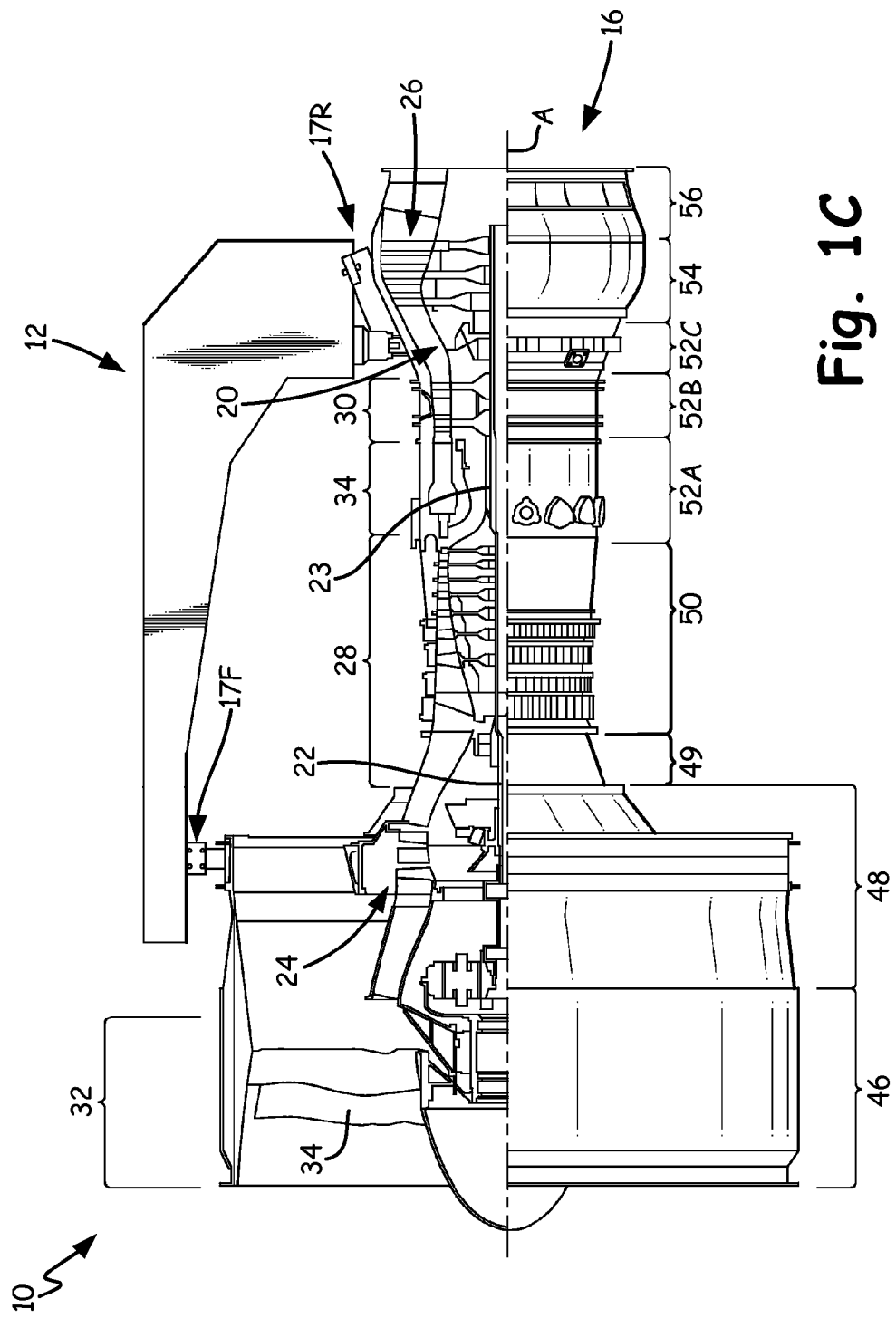
FIG. 1C is a schematic sectional view through a gas turbine engine along the engine longitudinal axis illustrating an engine static structure arrangement on a lower half.

FIG. 1C shows a schematic sectional view through engine 10 along the engine longitudinal axis. The upper half of engine 10 illustrates rotor structures and other components while the lower half of engine 10 shows an engine static structure arrangement. Low spool 22 includes low pressure compressor section 24 and low pressure turbine section 26. High spool 23 includes high pressure compressor section 28 and high pressure turbine section 30.

Engine 10 comprises a dual spool engine with low spool 22 and high spool 23. Low spool 22 drives fan section 32 connected to low spool 22 either directly or through a gear train (not numbered). Combustor 34 is arranged between high pressure compressor section 28 and high pressure turbine section 30. Low and high spools 22, 23 rotate about an engine axis of rotation A. Mid-turbine frame 20 is arranged generally between high pressure turbine section 30 and low pressure turbine section 26.

As illustrated in FIG. 1C, engine static structure generally has sub-structures including case structures often referred to collectively as the engine backbone. Engine static structure includes components, such as the mid-turbine frame 20, which supports bearings and engine backbone in turbine section as well as setting airflow entering low pressure turbine section 26. Engine static structure also generally includes fan case 46, fan frame 48, intermediate case 49, high pressure compressor case 50, combustor case 52A, high pressure turbine case 52B, thrust case 52C, low pressure turbine case 54, and turbine exhaust case 56. In some embodiments, combustor case 52A, high pressure turbine case 52B and thrust case 52C may be combined into a single case. It should be understood that the embodiment described is an exemplary configuration and any number of cases may be utilized. As will be discussed in further detail subsequently, engine static structure supports a bearing system upon which the turbines 26, 30, compressors 24, 28 and fan section 32 rotate.

Figure 2A:
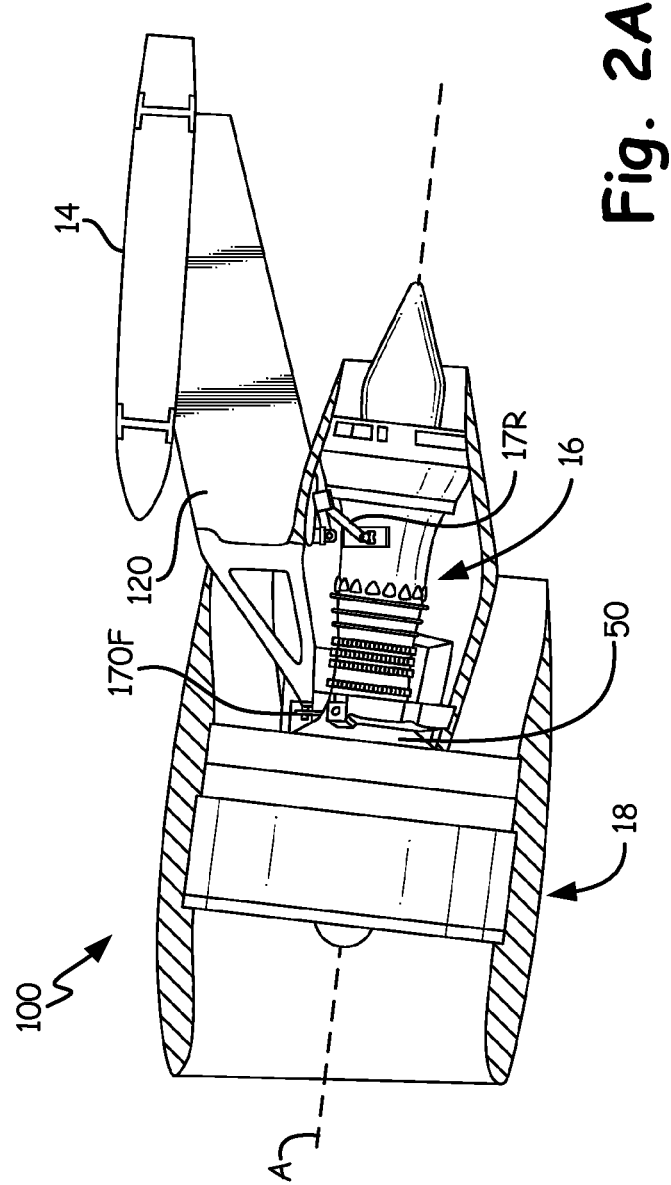
FIG. 2A is a side view of second embodiment of the engine mount system with a front mount affixed to a high pressure compressor case.
Figure 2B:
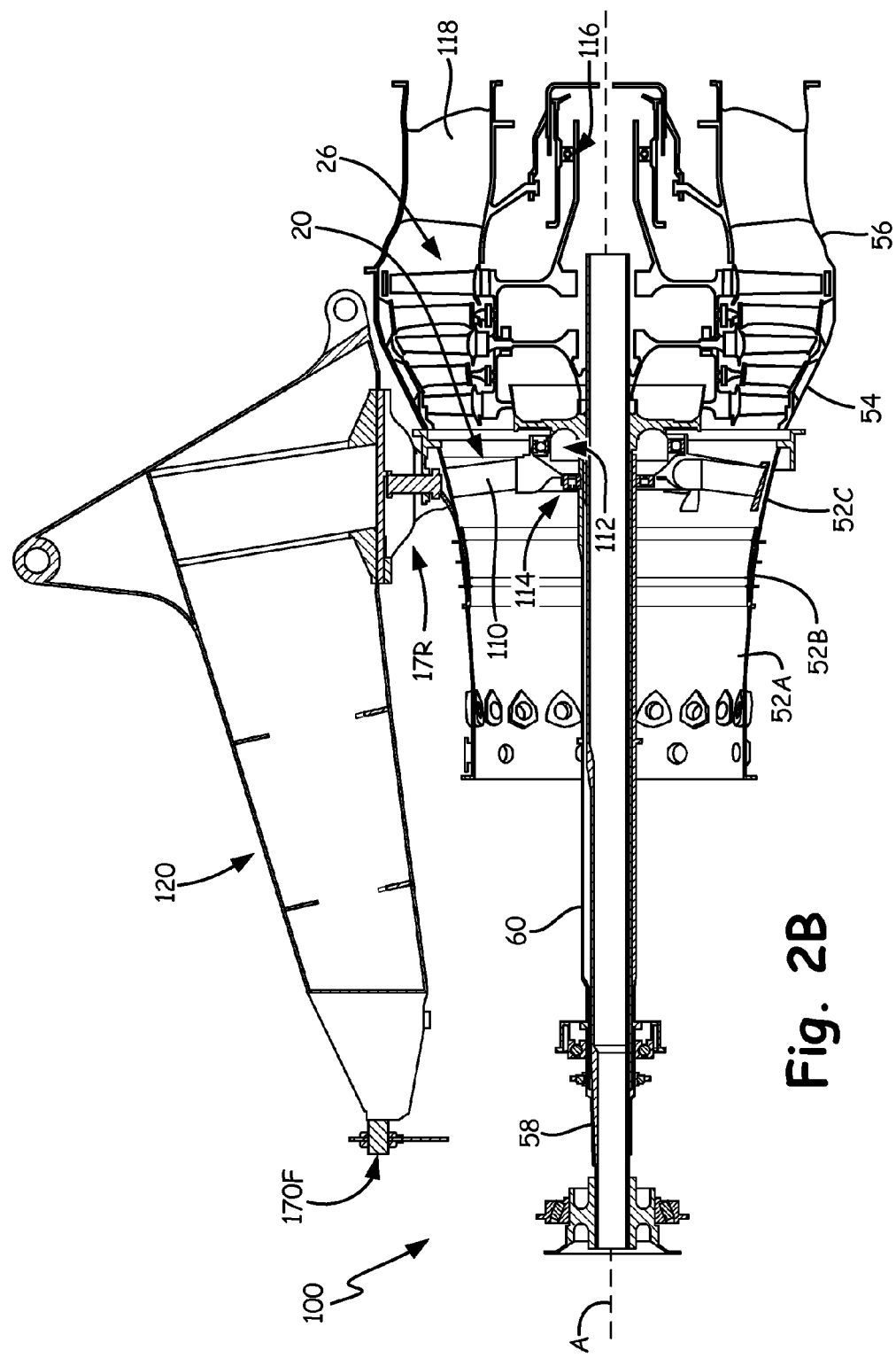
FIG. 2B is a side view of the engine mount system with a rear mount affixed to a mid-turbine frame.

FIG. 2A illustrates another mounting configuration of engine 100 with forward mount 170F attached to core 16 via intermediate case 49. Similar to the mounting configuration of FIGS. 1A-1C, rear mount 17R is mounted to mid-turbine frame 20 (FIG. 2B). Pylon 120 is adapted to extend from wing 14 through nacelle 18 and is attached to engine 100 via forward mount 170F and rear mount 17R.

Core 16 is disposed within nacelle 18, and is connected to portion of pylon 120 that is disposed under nacelle 18 via front mount 170F and rear mount 17R. Rear mount 17R reacts engine thrust at the aft (rear) end of engine 100. In the embodiment shown, rear mount 17R is secured to core 16 at mid-turbine frame 20 (FIG. 2B).

Forward mount 170F reacts vertical loads and side loads. In the embodiment shown in FIG. 2A mounts to core 16 at intermediate case 49, as is further described in the above noted U.S. Pat. Nos. 8,267,349, and 8,256,707.

Similar, to the embodiment of FIGS. 1A-1C, the arrangement of forward mount 170F and rear mount 17R to intermediate case 49 and mid-turbine frame 20 (FIGS. 2B and 3), respectively, creates a more aerodynamic configuration as pylon 120 is hidden within the lines of nacelle 18. Additionally, engine 100 is moved closer to pylon 120 and wing 14 to improve gully height. The arrangement also allows a larger area pylon 120 to be used if desired.

FIG. 2B shows engine 100 with structures such as nacelle 18 and portions of high pressure turbine section 30 removed. Additionally, a portion of static structures of core 16 such as high pressure compressor case 50 (FIG. 2A) are removed in FIG. 2B. Engine 100 static structure of FIG. 2B includes mid-turbine frame 20, combustor case 52A, high pressure turbine case 52B, thrust case 52C, low pressure turbine case 54, and turbine exhaust case 56. Engine 100 additionally includes low pressure turbine section 26, low pressure shaft 58, and center-tie shaft 60.

Figure 3:
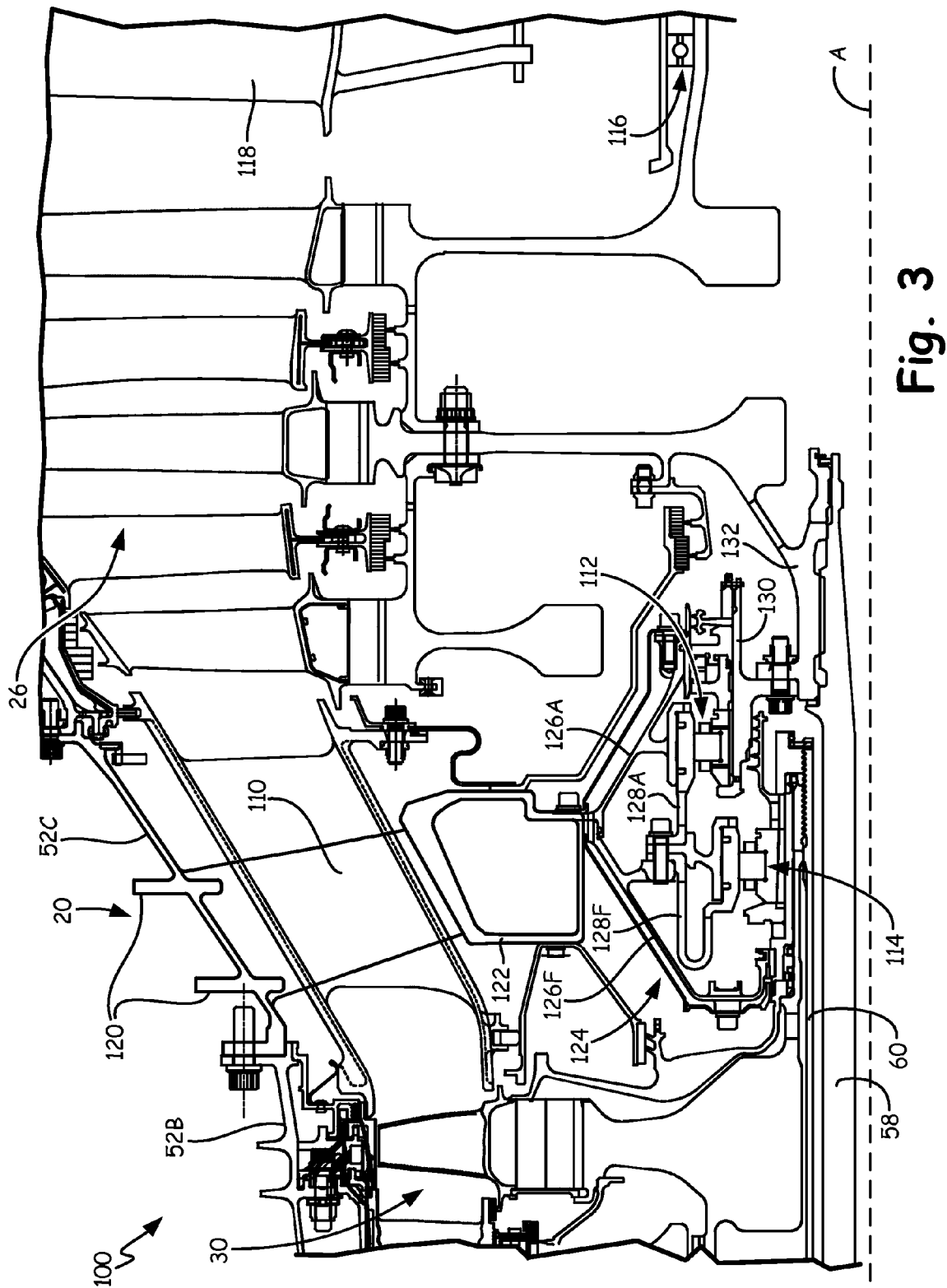
FIG. 3 is an enlarged sectional view of the mid-turbine frame supporting a first and second bearing and a third bearing supporting the low pressure turbine section.

Low pressure shaft 58 extends within core 16 and is coupled to low pressure turbine section 26. Center-tie shaft 60 is disposed radially outward of low pressure shaft 58, extends within core 16, and is coupled to high pressure turbine section 30 (FIGS. 1C and 3). Low pressure shaft 58 and center-tie shaft 60 rotate about axis A at different rotational speeds. In addition, mid-turbine frame 20 extends within core 16 in an intermediate turbine section between low pressure turbine section 26 and high pressure turbine section 30 (FIGS. 1C and 3). These structures are known and have been identified for reference only.

Mid-turbine frame 20 includes struts 110 that extend from thrust case 52C through flow path within core 16. Rear mount 17R is mounted to mid-turbine frame 20 via thrust case 52C.

According to the disclosed embodiments, mid-turbine frame 20 supports first bearing 112 and second bearing 114. First bearing 112 supports a portion of the load of low pressure turbine section 26 as well as low pressure shaft 58. Second bearing 114 supports the load of high pressure turbine section 30 (FIGS. 1C and 3) as well as center-tie shaft 60 (a part of high pressure shaft).

In addition to supporting a portion of the load of low pressure turbine section 26 (including low pressure turbine case 54), thrust case 52C additionally supports turbine exhaust case 56 including struts 118. In the embodiment of FIG. 2B, the remainder of the load of low pressure turbine section 26 is supported by third bearing 116.

By moving the rear engine mount 17R off of the turbine exhaust case 56 a less structural low turbine case 54 and turbine exhaust case 56 can be utilized reducing engine weight and reducing the size of turbine exhaust case 56 in some instances.

FIG. 3 shows an enlarged view of the embodiment of engine 100 from FIGS. 2A and 2B. Engine 100 includes high pressure turbine section 30, mid-turbine frame 20, and low pressure turbine section 26. High pressure turbine section 30 includes static structures such as high pressure turbine case 52B as well as rotor components. Low pressure turbine section 26 includes rotor components and static structures such as low pressure turbine case 54 (FIG. 2B), and turbine exhaust case 56 (FIG. 2B). According to the disclosed embodiments, mid-turbine frame 20 includes thrust case 52C, struts 110, first bearing 112, second bearing 114, lugs 120, and frame 122. Bearing compartment 124 is supported by mid-turbine frame 20 and includes forward bearing housing 126F, aft bearing housing 126A, forward bearing support 128F, aft bearing support 128A, and bearing mount 130.

As shown in FIG. 3, first bearing 112 and second bearing 114 are both housed within bearing compartment 124. Struts 110 extend radially inward from thrust case 52C toward axis A. Lugs 120 are disposed along thrust case 52C and are adapted to allow rear mount 17R (FIGS. 2A and 2B) to couple to engine 100. Struts 110 connect to frame 122, which is disposed radially inward of main gas flow path of engine 100. Frame 122 is connected to and supports bearing compartment 124. In particular, frame 122 is connected to forward bearing housing 126F and aft bearing housing 126A.

Forward bearing housing 126F extends axially forward and radially inward with respect to axis A. In the embodiment shown in FIG. 3, forward bearing support 128F is connected to forward bearing housing 126F and extends to interface with and provide a raceway for second bearing 114. Aft bearing housing 126A extends axially rearward and radially inward with respect to axis A. Aft bearing support 128A is connected to forward bearing housing 126F and is supported by aft bearing housing 126A. Aft bearing support 128A extends to interface with and provide a raceway for first bearing 112 in the embodiment shown in FIG. 3. Rotor mount 130 is connected to rotor 132 of low pressure turbine section 26. First bearing 112 is disposed on bearing mount 130 and is therefore disposed radially outward of second bearing 114 with respect to axis A. As shown in FIG. 3, first bearing 112 and second bearing 114 comprise roller bearings. Second bearing 114 is disposed forward of first bearing 112 with respect to a direction of airflow along main gas flow path of engine 100. In the embodiment of FIG. 3, second bearing 112 is disposed substantially entirely forward of low pressure turbine section 26.

Mid-turbine frame 20 supports first bearing 112 and second bearing 114. First bearing 112 supports a portion of the load of low pressure turbine section 26 as well as low pressure shaft 58. In one embodiment, bearing 112 supports half the load of low pressure turbine section 26. Second bearing 114 supports at least a portion of the load of high pressure turbine section 30, high pressure compressor 28, and additionally supports center-tie shaft 60.

In addition to supporting a portion of the load of low pressure turbine section 26, thrust case 52C additionally supports turbine case 54 and turbine exhaust case 56 including struts 118. In the embodiment of FIG. 3, the remainder of low pressure turbine section 26 is supported by third bearing 116. Thus, low pressure turbine section 26 has a straddled load configuration where load is carried by both the mid-turbine frame 20 and turbine exhaust case 56.

Alternatively, rear mount 17R (FIGS. 2A and 2B) can be connected to low pressure turbine case 54 in addition to, or in alternative to, mid-turbine frame 20. In another alternative, first bearing 112 can support a substantially full load of low pressure turbine section 26. Although described with reference to the embodiment of FIGS. 2A-3, the mounting system described is equally applicable to other mounting configurations including the mounting configuration of FIGS. 1A-1C.

The application discloses affixing a rear mount 17R, 170R to a mid-turbine frame 20 such that the mid-turbine frame 20 supports a load of a high pressure turbine section 30 as well as a portion of a load of a low pressure turbine section 26 including a turbine exhaust case 56. In one embodiment, this is accomplished utilizing two sets of bearings 112, 114 mounted to the mid-turbine frame 20. The low pressure turbine section 26 has a straddled configuration and is supported from the mid-turbine frame 20 by one of the two sets of bearings 112 as well as by the turbine exhaust case 56. The benefits of affixing the rear mount 17R, 170R to the mid-turbine frame 20 and utilizing two sets of bearings 112, 114 include: (1) a more aerodynamic configuration can be achieved because the pylon 12, 120 is hidden within the lines of the nacelle, (2) the engine can be moved closer to the pylon 12, 120 and wing 14 to improve gully height, (3) a larger cross-sectional area pylon 12, 120 can be used if desired, and (4) a lighter less structural low turbine case 54 and turbine exhaust case 56 can be utilized reducing engine weight and reducing the size of the turbine exhaust case 56.

Discussion of Possible Embodiments

A mounting system for a gas turbine engine includes a low pressure turbine section, a first bearing, a mid-turbine frame, and a rear mount. The first bearing supports at least a portion of the low pressure turbine section. The mid-turbine frame supports the first bearing. The rear mount is connected to the mid-turbine frame and is configured to react loads from the gas turbine engine.

The mounting system of the preceding paragraph can optionally include, additionally and/or alternatively, any one or more of the following features, configurations and/or additional components:

a high pressure turbine section and a second bearing supporting at least a portion of a load of the high pressure turbine section, the mid-turbine frame supports the second bearing;

the second bearing is disposed forward of the low pressure turbine section;

the second bearing is disposed forward of the first bearing;

the first bearing and the second bearing comprise roller bearings;

a rotor mount connected to a rotor of the high pressure turbine section, the first bearing is disposed on the rotor mount and is disposed radially outward of the second bearing with respect to a centerline axis of the gas turbine engine;

a bearing compartment housing both the first bearing and the second bearing;

a third bearing supporting a portion of a load of the low pressure turbine section;

the load of the low pressure turbine section is carried by both the mid-turbine frame and the turbine exhaust case; and a portion of the rear mount is connected to the low pressure turbine case.

A gas turbine engine includes a low pressure turbine section, a first bearing, a high pressure turbine section, a second bearing, a mid-turbine frame, and a rear mount. The first bearing supports at least a portion of the low pressure turbine section. The second bearing supports at least a portion of the high pressure turbine section. The mid-turbine frame supports both the first bearing and the second bearing. The rear mount connects to an exterior casing of the mid-turbine frame and is configured to react loads from the gas turbine engine.

The gas turbine of the preceding paragraph can optionally include, additionally and/or alternatively, any one or more of the following features, configurations and/or additional components:

a third bearing supports a portion of a load of the low pressure turbine section;

the load of the low pressure turbine section is carried by both the mid-turbine frame and the turbine exhaust case;

a portion of the rear mount is connected to the low pressure turbine case; and a pylon connected to the rear mount, wherein a portion of the pylon is disposed under a nacelle of the gas turbine engine.

A mounting system for a gas turbine engine includes a low pressure turbine section with a turbine exhaust case, a first bearing, a high pressure turbine section, a second bearing, a mid-turbine frame, and a rear mount. The first bearing supports the low pressure turbine section. The second bearing supports a portion of the high pressure turbine section. The mid-turbine frame supports both the first bearing and the second bearing. The rear mount connects to an exterior casing of the mid-turbine frame and is configured to react loads from the gas turbine engine.

The mounting system of the preceding paragraph can optionally include, additionally and/or alternatively, any one or more of the following features, configurations and/or additional components:

a rotor mount connected to a rotor of the high pressure turbine section, the first bearing is disposed on the rotor mount and is disposed radially outward of the second bearing with respect to a centerline axis of the gas turbine engine; and a bearing compartment housing both the first bearing and the second bearing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A mounting system for a gas turbine engine, the mounting system comprising:
    a low pressure turbine section;
    a first bearing supporting at least a portion of the low pressure turbine section;
    a mid-turbine frame supporting the first bearing;
    a rear mount connected to the mid-turbine frame, wherein the mount reacts loads from the gas turbine engine;
    a high pressure turbine section;
    a second bearing supporting at least a portion of a load of the high pressure turbine section, wherein the mid-turbine frame supports the second bearing; and
    a third bearing disposed within a turbine exhaust case and aft of the first and second bearings, the third bearing supporting a portion of a load of the low pressure turbine section;
    wherein the load of the low pressure turbine section is carried by both the mid-turbine frame and the turbine exhaust case.

2. The mounting system of claim 1, wherein the second bearing is disposed forward of the low pressure turbine section.

3. The mounting system of claim 1, wherein the second bearing is disposed forward of the first bearing.

4. The mounting system of claim 1, wherein the first bearing and the second bearing comprise rolling bearings.

5. The mounting system of claim 4, wherein the rolling bearings comprise roller bearings.

6. The mounting system of claim 1, further comprising:
    a rotor mount connected to a rotor of the high pressure turbine section, wherein the first bearing is arranged coaxial with the second bearing, and wherein the first bearing is disposed on the rotor mount and is disposed radially outward of the second bearing with respect to a centerline axis of the gas turbine engine.

7. The mounting system of claim 1, further comprising:
    a bearing compartment housing both the first bearing and the second bearing.

8. The mounting system of claim 1, wherein a portion of the rear mount is connected to the low pressure turbine case.

9. The gas turbine engine of claim 1, wherein
    the rear mount is connected to an exterior casing of the mid-turbine frame.

10. The gas turbine engine of claim 1, further comprising a pylon connected to the rear mount, wherein a portion of the pylon extends below an outer surface of a nacelle of the gas turbine engine.

* * * * *